United States Patent [19]

Takagi

[11] Patent Number: 4,509,796
[45] Date of Patent: Apr. 9, 1985

[54] SEAT FRAME FOR VEHICLE SEAT
[75] Inventor: Genjiro Takagi, Tokyo, Japan
[73] Assignee: Tachikawa Spring Co., Ltd., Tokyo, Japan
[21] Appl. No.: 453,937
[22] Filed: Dec. 28, 1982
[30] Foreign Application Priority Data Dec. 29, 1981 [JP] Japan .................. 56-195022[U]
Dec. 29, 1981 [JP] Japan .................. 56-195023[U]

[51] Int. Cl.³ .................................. A47C 7/02
[52] U.S. Cl. ........................... 297/452; 297/445
[58] Field of Search ......... 297/445, 443, 458, 248,
297/232, 440, 452; 248/393; 52/8; 244/122 R;
296/63, 64

[56] References Cited

U.S. PATENT DOCUMENTS 2,641,311 6/1953 Ingram, Jr. et al. ............ 297/445 X
3,107,944 10/1963 Baermann ...................... 297/452
3,702,204 11/1972 Tipton et al. ................... 297/248
3,891,267 6/1975 Taylor ......................... 297/440 X
4,438,603 3/1984 Durkan, Jr. .................... 297/232 X

FOREIGN PATENT DOCUMENTS 2850654 5/1979 Fed. Rep. of Germany ...... 297/452

Primary Examiner—James T. McCall
Attorney, Agent, or Firm—Sandler & Greenblum

[57] ABSTRACT

An improved pan cushioning frame for a vehicle seat is disclosed. The frame comprises separately-formed two side frames and a center panel. The side frames are made of steel plate which is thicker than that for the center panel. The three parts are connected together to form the pan cushioning frame. According to the invention, the frame thickness and form can be selected depending on load to be applied thereto, and it requires no additional reinforcing members. Further, the frame will not be over-strong since too thick plate is not used.

4 Claims, 7 Drawing Figures

SEAT FRAME FOR VEHICLE SEAT

FIELD OF THE INVENTION

The present invention relates to a pan shaped cushioning frame for a vehicle seat. More particularly, the invention relates to a cushioning frame consisting of two side frames and a center panel, which are formed separately in such a manner that the side frames are formed of thick steel plate while the center panel is formed of relatively-thin plate.

BACKGROUND OF THE INVENTION

Conventionally, a seat frame of pan shaped structure is made integrally of plastic resin material, or made of molded steel plate. When the seat frame is produced by press-molding, side frames and the center panel are formed to have uniform thickness since they are integrally molded.

However, the side frames of the pan structure frame should be more stronger and should be thicker than the center panel since a device for adjusting seat sliding, a device for changing the seat angle, and so on, are fixed to the frames, and since load from a back seat is applied to the frames by way of the device for changing the seat angle.

In order to produce thick side frames, however, the whole seat frame itself including its center panel, is inevitably made of thick steel plate, which results in increasing the total weight. Therefore, the whole seat frame has been made of relatively thin steel plate so as reduce the total weight, and reinforcing plates have been fixed to the side frames to increase their strength.

According to these conventinal processes, however, since side frames are formed complexed structure, a number of production steps are necessary for producing the side frames. In addition, the setting position to stop the device for sliding the seat, or that for adjusting seat angle, is limited only to certain area. This results in inconveniences for designing the seat frame and in requiring an insufficient number of steps.

SUMMARY OF THE INVENTION

Accordingly, in view of the above-described disadvantages in the prior art, it is a general object of the present invention to provide a new and improved cushioning frame for a vehicle seat, wherein the frame thickness and form can be selected depending on load to be applied thereto, without requiring additional reinforcing members and, further, without over-strong due to being too thick.

BRIEF DESCRIPTION OF THE DRAWINGS

The above and other objects, features, and advantages of the present invention will be more fully apparent to those of ordinary skill in the art to which this invention pertains from the following detailed description when considered in connection with the accompanying drawings, in which like reference characters designate like or corresponding parts throughout the several views, and wherein:

FIG. 4 is an analytical perspective view of the embodiment;

FIG. 5 is a view illustrating a way to set up the frame of the embodiment shown in FIG. 4;

FIG. 6 is a view similar to FIG. 4, but side frames shown in FIG. 4 are reversely welded to the center panel; and FIG. 7 is a view similar to FIG. 5.

DETAILED DESCRIPTION OF THE INVENTION

Figure 1:
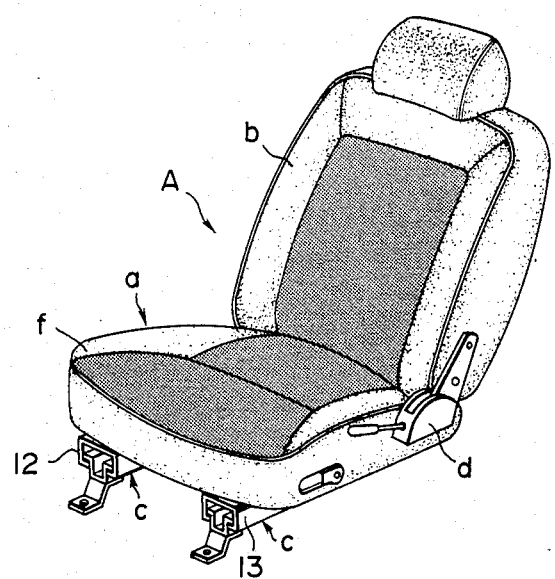
FIG. 1 is a perspective view of the vehicle seat to which the cushioning frame of the present invention is applied.

FIG. 1 shows a whole vehicle seat A, which comprises seat cushion a, seat back b, device for seat sliding c, device for controlling seat angle d, and cushioning frame f of the invention.

Figure 2:
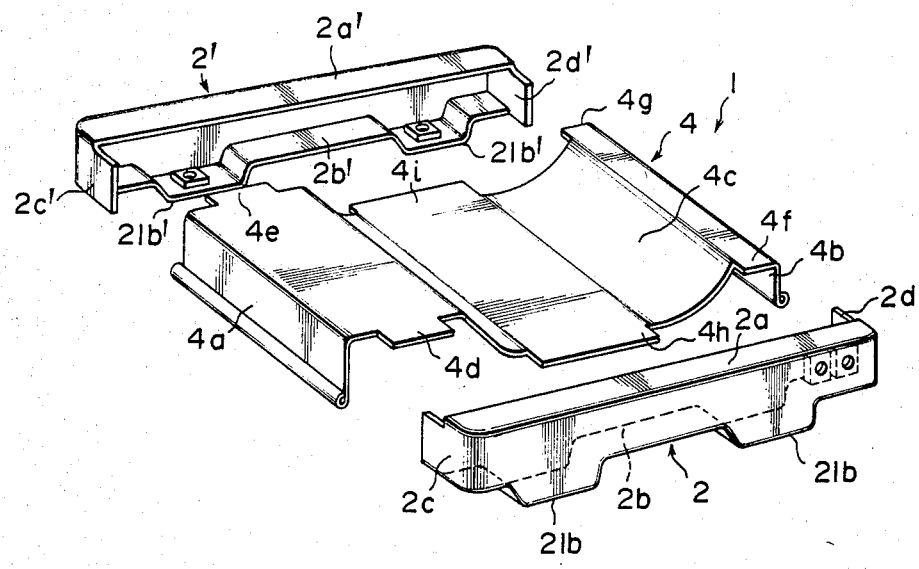
FIG. 2 is an analytical perspective view of an embodiment of the cushioning frame according to the invention.
Figure 3:
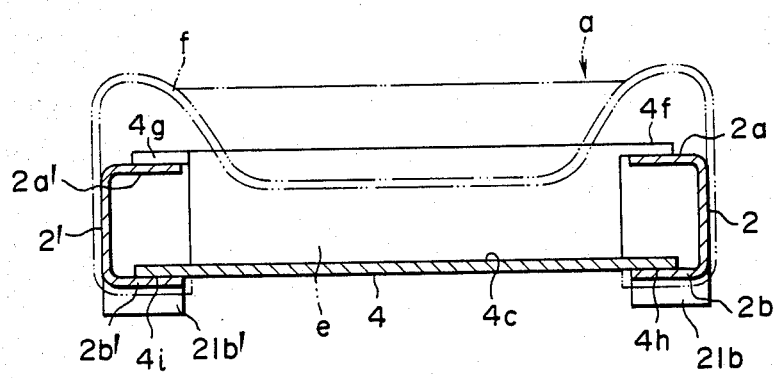
FIG. 3 is a cross sectional view of a seat cushion to which the frame of the invention is applied.

FIGS. 2 and 3 show an embodiment of the cushioning frame 1 according to the invention which consists of two side frames 2, 2' and center panel 4. Side frames 2, 2' consist of upper parts 2a, 2a' and lower parts 2b, 2b'. These parts end at curved parts 2c, 2d, 2c', 2d'. Tower parts are provided with legs 21b, 21b'.

Center panel 4 is made of steel plate which is thinner than that for side frames 2, 2'. Its ends form front and rear inclined margins 4a,4b. Further sides of its front and rear parts and recesses part 4c, are provided with integral welding projections 4d, 4e, 4f, 4g, 4h, 4i, as shown in FIG. 3.

Center panel 4 is welded to side frames 2, 2' in such a manner that margins 4a and 4d, respectively, are welded to curved parts 2c, 2c' and 2d, 2d', that projections 4d, 4e, 4f, 4g are welded to upper parts 2a, 2a', and that projections 4h, 4i are to lower parts 2b, 2b'. In this way, side frame 2, 2' and center panel 4 are integrated to from pan-shaped cushioning frame 1.

Since side frames 2, 2' are made of relatively-thick steel plate, cushioning frame 1 is strong enough while since center panel 4 is relatively thin, total frame 1 is light in weight.

As shown in FIG. 3, foam pad material e is provided over cushioning frame 1, specifically over center panel 4. Pad e is covered by cover 4 in a way that whole cushioning frame 1 is covered. Rear part of seat cushion a is sunken on account of recessed part 4c. Therefore, since a driver is sunken comfortably in rear part, he will not be gradually slided forward.

FIGS. 4 through 7 show another embodiment of cushioning frame for driver's seat and/or his partner's seat, in which side frames are fixed detachable to center panel. Side frames are made reversible so that lifter or such which is to be provided to driver's seat, may be mounted to them if necessary when frames are reversed.

Figure 4:
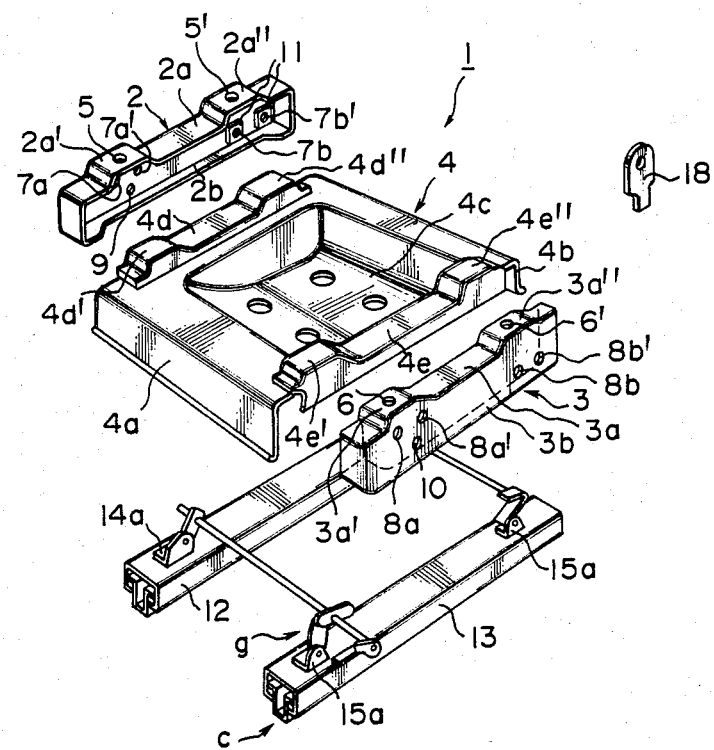
FIGS. 4 through 7 illustrate another embodiment of the cushioning frame of the present invention and specifically.
Figure 5:
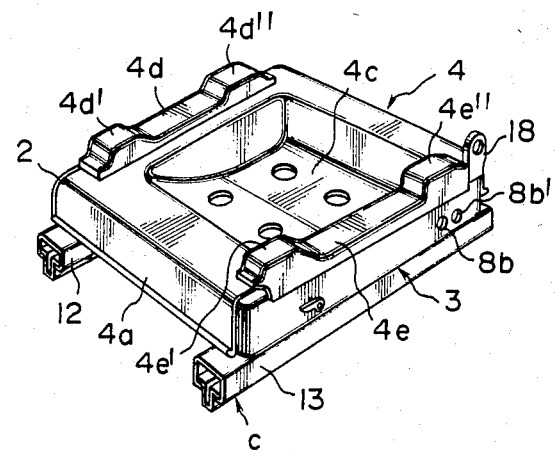

FIG. 4 shows an analytical perspective view of cushioning frame to which lifter can be fixed and FIG. 5 illustrates how to set up frame.

In drawings, respective upper part 2a, 3a of side frames 2 and 3 are formed relatively broad while lower parts 2b, 3b are narrow. Upper parts 2a, 3a, include projections 2a', 2a'', 3a', 3a'' having holes 5, 5', 6, 6'.

Side parts 2c, 3c of projections are provided with pairs of holes 7a and 7b, 7a' and 7b', 8a and 8b, 8a and 8b'. These holes are positioned symmetrical with each other along a horizontal line. That is, front holes 7a, 7b, 8a, 8b are positioned near upper margin, while rear holes 7a', 7b', 8a', 8b' are positioned near lower margin. Further, axis holes 9 and 10 are provided at forward positions. Nut 11 is welded from inside of holes.

Center part of center panel 4 is sunken to form recess 4c. Side parts of panel 4 are provided with recesses 4d, 4e engaging with recesses of upper parts 2a, 3a of side frames 2, 3, and projections 4d', 4d'', and 4e', 4e'' engaging projections 2a', 2a'' and 3a', 3a'', respectively, of side frames.

Side frames 2, 3 and center panel 4 are connected together to form pan cushioning frame 1. In connecting these parts, upper parts 2a, 3a of side frames are fitted to recesses 4d, 4e of center panel 4, projections 2a', 2a'', the 3a', 3a'' to recesses 4d'', 4d''', respectively, for positioning and, then these parts are welded together.

Narrow bottom of side frame part of frame 1, is placed on upper rails 12, 13 on which a lifter g is supported by brackets 14a, 15b and 16a, 17a in such a manner that the bottom will be apart from brackets. Cushioning frame 1 thus assembled, can be used for driver's seat to which devices such as lifter g are mounted.

Figure 6:
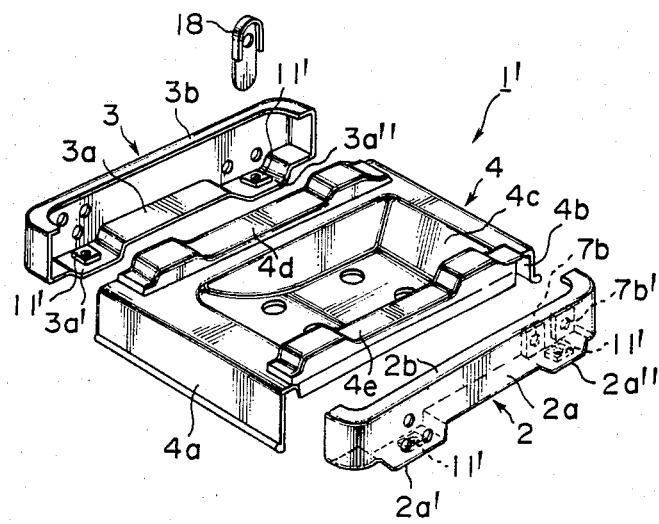
Figure 7:
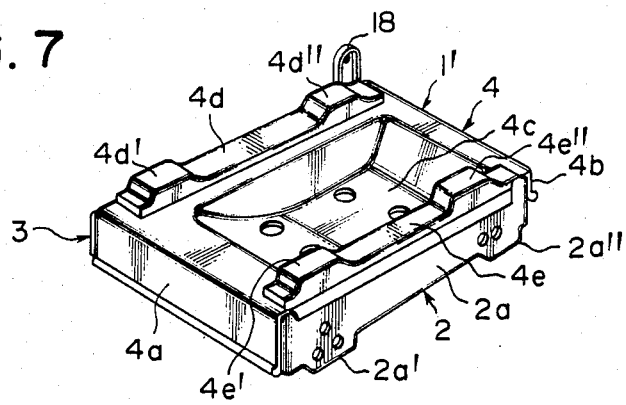

FIGS. 6 and 7 show an embodiment of the invention in which cushioning frame can be used also to partner's seat. Cushioning frame 1' shown in FIG. 6, is formed such that side frames 2, 3 shown in FIGS. 4, 5, are reversely fixed to center panel 4.

According to this embodiment, side frames 2, 3 of FIGS. 4, 5 are reversed and fitted to center panel 4 such that lower part 2b of side frame 2 is fitted to recess 4e of panel, lower part 3b of frame 3 is fitted to recess 4d, and welded together to form pan cushioning frame 1'.

Bottom of side part of thus formed frame 1' is broad. Projections 2a', 2a'' and 3a', 3a'' function as legs of this frame and are placed on upper rails 12, 13 used for seat-sliding device. Frame 1' can be used to partner's seat to which seat-sliding device is directly fixed.

Positions at which device for adjusting seat angle is fixed, are located opposite between driver's and partner's seats. Therefore, in the embodiment of FIGS. 4, nut 11 for fixing device for adjusting seat angle, is fixed to rear part of one side frame 2, i.e. inside of holes 7b, 7b', while in the frame 1' of FIGS. 6, 7, nut 11 is fixed to other side frame, i.e. holes 7a, 7a' of frame 2. Bracket 18 used for free hinge is fixed to position corresponding to that for fixing angle-adjusting device, for both of frames 1, 1'.

Concerning frame 1' of FIGS. 6, 7, nuts 11' for upper rails 12, 13 sliding device c are fixed to inside of holes 5, 5', 6, 6' of projections 2a', 2a'', 3a', 3a''.

According to embodiment shown in FIGS. 4 through 7, side frames can be reversed. Therefore, it is possible to use side frames to driver's seat to which seat-sliding device and lifter are provided, and also to partner's seat which can be placed directly on floor and to which seat-sliding device is provided.

According to the invention, side frames are made of relatively thick steel plate while center panel is made of thin plate. Therefore, produced cushioning frame requires no additional reinforcing members and, further, it is not over-strong due to being not too thick. Since thickness is different between side plates and center panel, total weight of plate can be minimized, resulting in economy of material cost.

What is claimed is:

1. A frame for supporting a vehicle seat cushion comprising a substantially pan-shaped metallic frame, said frame having two distinct side frames and a central panel, the central panel being formed from metal which is thinner than metal from which said side frames are formed, each of said side frames having a substantially U-configured cross section and upper end lower parts, said side frames having ends which are curved, said center panel further comprising front and rear inclined margins and side welding projections, said side frames and said center panel being attached to each other wherein said center panel margins and said welding projections are are fitted to said side frames and welded to each side frame.

2. A frame for supporting a vehicle seat cushion comprising a substantially pan-shaped metallic frame, said frame having two distinct side frames and a central panel, each of said side frames having a substantially U-configured cross section, and upper and lower parts, said side frames having ends which are curved, said center panel further comprising front and rear inclined margins and side welding projections, said side frames and said center panel being attached to each other wherein said center panel margins and said welding projections are fitted to said side frames and are welded to each other, said side frame upper parts including flat projections with holes therein, said side frames having side parts, wherein portions of said side parts which are located below said projections are each provided with pairs of holes, and wherein said center panel projections are adapted to engage said side frame projections.

3. A frame in accordance with either of claims 1 or 2 wherein said front and rear center panel margins are inclined downwardly, and wherein said center panel has a rear part which is sunken, said side welding projections being fitted to said side frame lower parts and being welded to said side frame lower parts.

4. A frame in accordance with either of claims 1 or 2 wherein one of said upper and lower side frame parts is relatively broad and the other of said side frame upper and lower parts is relatively narrow so that it will not face a bracket for attaching devices to said seat, said side frames being attached to opposed sides of said center panel.

* * * * *

UNITED STATES PATENT AND TRADEMARK OFFICE
CERTIFICATE OF CORRECTION

PATENT NO. : 4,509,796
DATED : April 9, 1985
INVENTOR(S) : Genjiro TAKAGI

It is certified that error appears in the above-identified patent and that said Letters Patent is hereby corrected as shown below:

At column 1, line 22, delete "more";

At column 1, line 25, change "backseat" to ---seat back---;

At column 1, line 33, add ---to--- before "reduce";

At column 1, line 51, add ---being--- before "over-strong";

At column 3, line 15, change "4D''" (first occurrence) to ---4D'---;

At column 4, line 18, change "end" to ---and---;

At column 4, line 24 delete "are" (second occurrence)

Signed and Sealed this

Twenty-ninth Day of October 1985

[SEAL]

Attest:

Attesting Officer

DONALD J. QUIGG

Commissioner of Patents and Trademarks—Designate